United States Patent [19]

Togashi

[11] 4,345,
[45] Aug. 17,

[54] LIQUID CRYSTAL DISPLAY PANEL

[75] Inventor: Seigo Togashi, Tokorozawa, Japan

[73] Assignee: Citizen Watch Company Limited, Tokyo, Japan

[21] Appl. No.: 215,901

[22] Filed: Dec. 12, 1980

[30] Foreign Application Priority Data

Dec. 25, 1979 [JP] Japan .................. 54-167542

[51] Int. Cl.³ .............................................. G06F 3/02
[52] U.S. Cl. ............................ 340/784; 340/714; 340/719; 340/771
[58] Field of Search ............... 340/713, 714, 718, 719, 340/763, 765, 766, 771, 784

[56] References Cited
U.S. PATENT DOCUMENTS

4,239,346 12/1980 Lloyd .................. 340/784

*Primary Examiner*—Alvin H. Waring
*Attorney, Agent, or Firm*—Jordan and Hamburg

[57] ABSTRACT

In a matrix type of liquid crystal display panel, in v an individual switching element is provided o panel for each of the display elements, the electro each display element comprise a first comb-shaped trode pattern, to which a display signal voltage plied through a switching element, and a second c shaped electrode pattern which is held at a refe potential, with the first and second comb-shapec terns being mutually intermeshed and formed uj single substrate of the panel, whereby application display signal voltage causes an electric field to be duced in a direction substantially parallel to the strate plane to thereby act upon the liquid crystal, r than in a direction normal to the substrate plane as case of a conventional type of liquid crystal di panel.

8 Claims, 13 Drawing Figures

LIQUID CRYSTAL DISPLAY PANEL

BACKGROUND OF THE INVENTION

The present invention relates to an improved type of liquid crystal display panel having an individual switching element coupled to each display element of the display panel.

Liquid crystal display panels have been developed in order to provide a display of relatively large amounts of data, in devices in which power consumption must be held to the lowest possible level. Such devices include electronic timepieces, electronic calculators, ultra-small television receivers, etc. These liquid crystal display panels are basically of matrix configuration, with row and column electrodes being arranged on one substrate of the display panel and a display electrode being provided at each intersection of the row and column electrodes. A planar electrode is usually provided on the opposite substrate of the display panel, with the liquid crystal material being enclosed between the two substrates. The planar electrode is held at some fixed, reference potential, so that when a display signal is applied to a particular display electrode by means of the row and column electrodes, an electric field is produced between the display electrode and the reference potential electrode, whereby the portion of liquid crystal to which this electric field is applied is energized, in other words the corresponding display element is made visible. In order to provide a display panel which has a large number of display elements, it is necessary to perform time-division multiplexing of the signals applied to the row and column electrodes of the display panel. However, due to the characteristics of the liquid crystal material, it has been found that in practice it is necessary to adopt a system in which a single switching element is coupled to each display element of the display panel, in order to permit reasonably high-level multiplexing of the signals applied to the row and column electrodes. This switching element enables a display signal to be applied to a selected display electrode, and to thereafter isolate that display electrode so that the charge resulting from the display signal voltage is left stored on the display electrode. Such a type of liquid crystal display panel, in which switching elements (e.g. field-effect transistors) are "built into" the display panel has been described in the prior art by B. J. Leichner et al (Proc. IEEE, Vol. 59, Nov. 1971, p. 1566 to 1579). This type of display panel offers the important advantage that, even if the level of multiplexing of the signals applied to the row and column electrodes is comparatively high, there is essentially an absence of cross-talk effects. However, prior art examples of such "built-in switching element" type display panels have various disadvantages. These are associated with the fact that the row and column electrodes are formed upon one substrate of the display panel, and a planar reference potential electrode (referred to hereinafter for convenience as a reference electrode) is formed upon the opposing substrate. Thus, substantial levels of stray capacitance exist between the row and column electrodes and the reference electrode. As a result, if the speed of switching of the signals applied to the row and column electrodes is comparatively high (as will be necessitated by high-level multiplexing), then the amount of power which is consumed as a result of charging and discharging the stray capacitances will also be high. Thus, with a conventional type of liquid crystal display panel of the "built-in switching e type, it is difficult to provide a large number of elements, or to reduce the number of connecti to the various electrodes, by increasing the s switching of display signals. However, it is high able to be possible to increase the speed of swit the display signals of such a liquid crystal displa so that the number of interconnecting leads betv display signal circuitry and the display panel ele can be reduced, in order to facilitate the manufa such display panel systems in an economic man These problems are substantially alleviated b uid crystal display panel constructed in acco with the present invention. As stated above, th vantages of such prior art types of liquid crystal panels are basically due to the fact that row and electrodes, carrying signals which are switch comparatively high frequency, are formed on c strate of the display panel, while the reference el is formed as a planar electrode upon the opposi strate, so that an electric field is generated in a d which is perpendicular to the substrate plane, i to activate a particular display element. With tl ent invention, however, both the row and colun trodes, and also the reference electrode, are upon a single substrate. In order to activate a pa display element, an electric field is applied bet reference electrode and a display electrode, which is arranged in the form of a comb-shaped with the electrode patterns being mutually inter as will be made clear by the description herein specific embodiments of the present inventioi result, the degree of stray capacitances whic between the various electrodes of the display substantially reduced, by comparison with liquid display panels of the prior art, so that the frequ switching of signals applied to the display pan trodes can be signficantly increased without ar sive increase in power consumption. A liquid display panel according to the present inventi therefore utilize a high degree of multiplexing signals applied to the row and column ele whereby the number of interconnecting leads b the source of drive signals for the row and electrodes and these electrodes can be subst reduced. Manufacture of a display system incl display panel according to the present inventioi fore is made easier and more economical, by c son with liquid crystal display panels of the pri

SUMMARY OF THE INVENTION

The present invention comprises a liquid cry play panel, basically having a matrix configura which an individual switching element is provide the display panel for each of the display elemer important feature of novelty of a liquid crystal panel according to the present invention reside fact that, to energize a specific region of the liqu tal in order to activate a particular display elen electric field is applied to the liquid crystal suc have at least a component which is directed pa the plane of the display panel. This electric field erated by applying a display signal voltage to a electrode, which is formed into a comb-shaped upon one of the substrates of the display pane arranged in an intermeshing relationship with ence electrode which is also formed into a comb pattern upon the same substrate as the display electrode. Such an arrangement provides the advantage that the amount of stray capacitance which arises between the reference electrode (which is held at some fixed reference potential) and the display electrode is substantially reduced by comparison with prior art types of liquid crystal display panels. The display signal voltage is applied to a display element through a corresponding switching element, by means of signals applied to the switching element from row and column electrodes. Since all of the electrodes of a display panel are formed upon a single substrate, manufacture of the display panel is simplified. In addition, since higher switching speeds can be applied to the display signals, a high degree of multiplexing of these signals can be utilized, so that the number of interconnections between the drive signal generating circuitry and the actual display panel can be reduced, thereby further facilitating the manufacture of a display panel according to the present invention.

DESCRIPTION OF THE PREFERRED EMBODIMENTS

Figure 1:
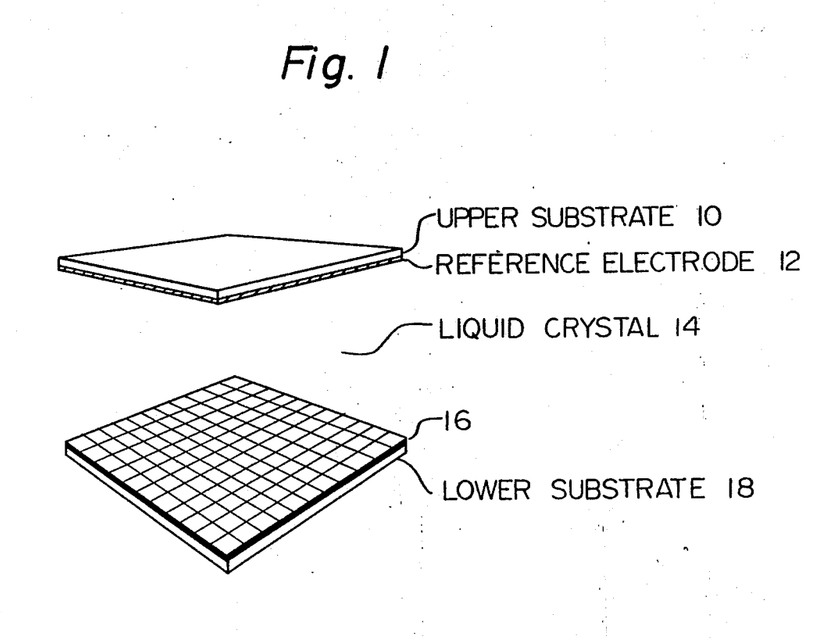
FIG. 1 is a simplified diagram to illustrate the general configuration of a liquid crystal display panel of the prior art.

Before describing various embodiments of display panels according to the present invention, a general description will be given of prior art types of liquid crystal display panel, in which switching elements are built into the display panel, with an individual switching element being provided for each of the display elements. FIG. 1 is a diagram illustrating the general configuration of such a display panel. In FIG. 1, reference numeral 10 denotes a first substrate, which we shall refer to for convenience as the upper substrate, upon which is formed a reference electrode 12. Reference electrode 12 is held at a predetermined reference potential, as described hereinafter, and covers substantially the entire area of substrate 10. Numeral 18 denotes a second substrate, which we shall designate as the lower substrate, for convenience of description. Numeral 16 denotes a composite layer of conductors and electrodes formed upon substrate 18, comprising row electrodes, column electrodes, switching elements, and display electrodes. A liquid crystal material is enclosed between the upper and lower substrates 10 and 18, as designated by numeral 14.

Figure 2:
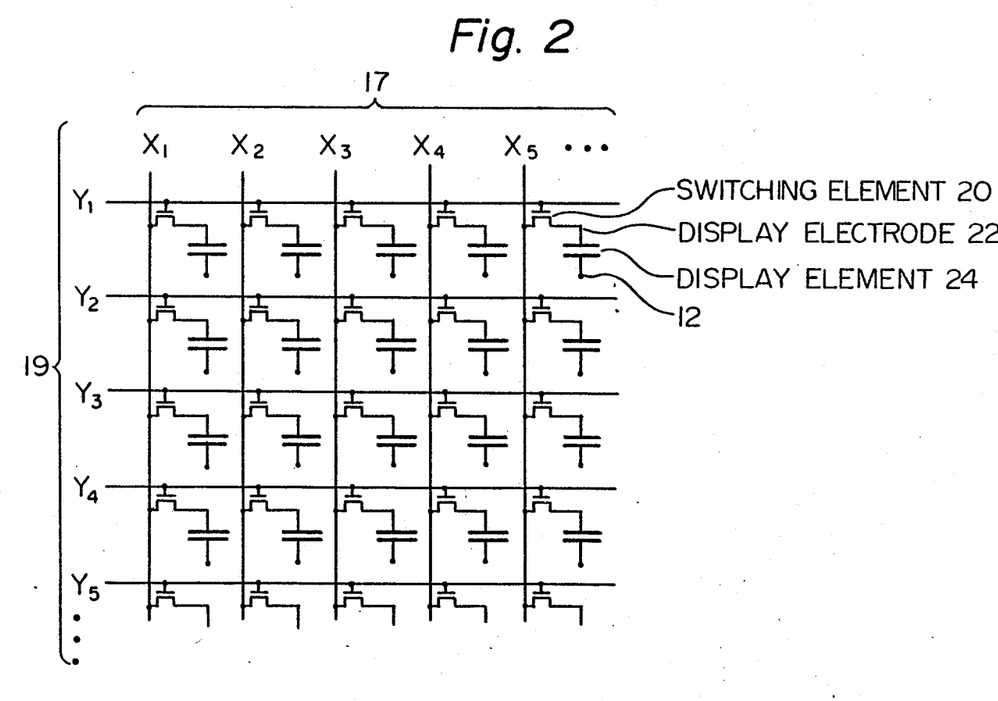
FIG. 2 is an equivalent circuit diagram of a portion of a liquid crystal display panel which has built-in switching elements.

The equivalent circuit diagram of a portion of a display panel of the type shown in FIG. 1 is shown in FIG. 2. Here, numerals 17 and 19 denote a set of column electrodes and a set of row electrodes respectively. At each of the intersections between a row electrode and a column electrode, such as the intersection between row electrode $Y_1$ and column electrode $X_1$, a switching element is provided, as denoted by numeral 20. In this example, the switching elements are assumed to comprise field-effect type transistors, with the gate electrodes of sets of these switching elements being connected in common to a row electrode, such as row electrode $Y_1$ in FIG. 2. Numeral 22 denotes a display electrode, which is formed upon the lower substrate 18 shown in FIG. 1, and which defines the area of a single display element, denoted by numeral 24. In order to activate a display element, such as the display element 24 shown in FIG. 2, a display signal voltage is applied to the corresponding column electrode (in this case, column electrode $X_5$) while a scanning signal is being applied to the row electrode of the display element (in this case, row electrode $Y_1$). Since the switching element is made conductive, between its terminals which are connected to the row electrode and display electrode, at this time, the display signal voltage is applied to the display electrode. An electric field is thereby produced between the display electrode 22 and the reference electrode 12, for the display element 24 of FIG. 2. After the scanning signal is removed from the control electrode of the switching element 20, display electrode 22 becomes isolated from the column conductor (e.g. from $X_5$) by the very high resistance of the OFF state of the switching element. The display signal voltage between display electrode 22 and reference electrode 12 is thereby held constant (i.e. a charge is stored on display electrode 22) until the corresponding row electrode is again subjected to the scanning signal. When this occurs, the voltage appearing on display electrode 22 may be left unchanged, or may be removed, depending upon the display signal voltage which is applied to the column electrode at that time. Application of the scanning signal to the row electrodes 19 is performed in a sequential manner, e.g. in the order $Y_1, Y_2, Y_3, \ldots$ for the example of FIG. 2.

Figure 3:
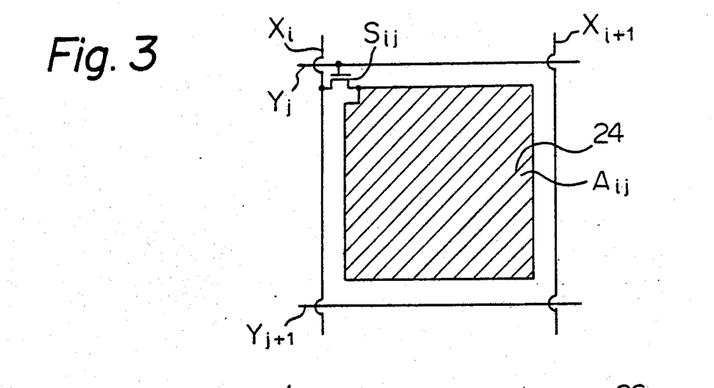
FIG. 3 is a diagram illustrating the essential features of a display element of a display panel of the built-in switching element type.

FIG. 3 is a diagram illustrating the configuration of a single display element, designated as 24, in a display panel such as that of FIG. 2. Display element 24 is formed within an area which is surrounded by row electrodes $Y_j$ and $Y_{j+1}$, and column electrodes $X_i$ and $X_{i+1}$. The display electrode, shown as a hatched area, is designated as $A_{ij}$, and is connected to the column electrode $X_i$ through a switching element $S_{ij}$, under the control of scanning signals applied to the control electrode of switching element $S_{ij}$ from the row electrode $Y_i$. In practical terms, display element 24 comprises a region of liquid crystal which is positioned between the display electrode $A_{ij}$ and the reference electrode which covers the entire area of the substrate opposite that upon which display electrode $A_{ij}$ is formed.

Figure 4:
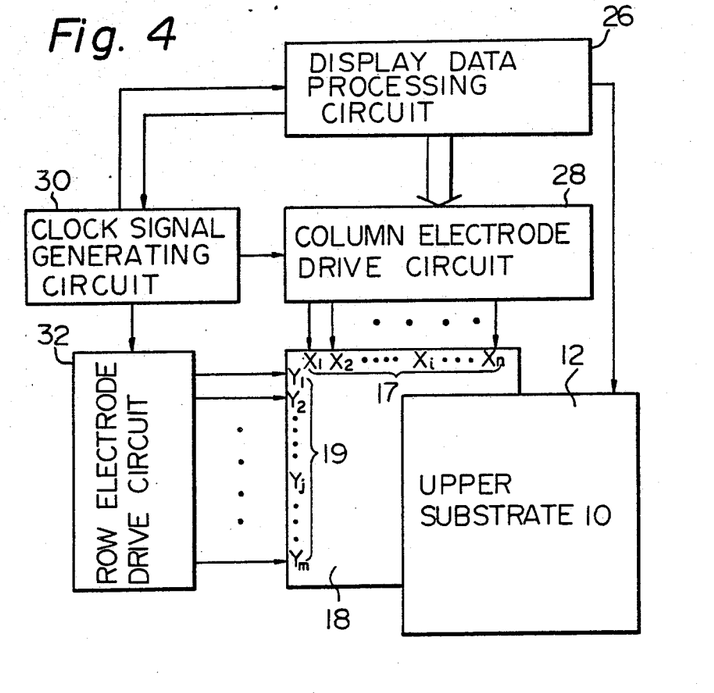
FIG. 4 is a general block diagram of a display system which includes a display panel.

Referring now to FIG. 4, an overall block diagram is shown therein of a display system which includes a liquid crystal display system such as that illustrated in FIGS. 1 and 2. Numeral 26 denotes a display data processing circuit, which serves to generate data specifying the display pattern which is to be produced by the display panel. This display data is applied to a column electrode drive circuit 28, which generates drive signals to be applied to the column electrodes 17 (i.e. $X_1 \ldots X_n$) of the display panel, formed on substrate 18. Numeral 32 denotes a row electrode drive circuit, which serves to generate row electrode drive signals to sequentially scan the row electrodes 18 (i.e. $Y_1 \ldots Y_n$). The timing of the signals produced by display data processing circuit 26 and row electrode drive circuit 32 is determined by signals produced by clock signal generating circuit 30. It can be understood that, when the scanning signal from row electrode drive circuit 32 is applied to a particular row electrode, thereby rendering the switching elements controlled by that row electrode conductive, the state of the display data being output by display data processing circuit 26 will be, in effect, "written into" the display elements of the switching elements referred to above. The display data will then remain stored in that row of display elements until the corresponding set of switching elements is again scanned by the output signal from row electrode drive circuit 32. Such a display system has the important advantage that the effects of crosstalk are almost negligible, due to the isolation of display elements which is provided by the switching elements on the display panel.

Such a display system however has the disadvantage that the stray capacitances which arise between the various electrodes are comparatively high, so that if the speed of switching of the signals applied to the row and column electrodes is high, then power consumption becomes excessive. The reasons for these high values of stray capacitance will now be explained, with reference to FIG. 5, which is a simplified cross-sectional view of part of a display panel having built-in switching elements, of the type described above. Here, a display signal voltage is applied to an area of liquid crystal 14 which is contained between the display electrode 22 and the reference electrode 12. It can be seen that, with this type of display panel arrangement, it is inevitable that the row electrodes, designated here as Y, and the column electrodes, designated as X, must be positioned opposite and parallel to the reference electrode 10. Thus, stray capacitances, designated as $C_{xz}$ and $C_{yz}$ arise between the column electrodes and the reference electrode and between the row electrodes and the reference electrode, respectively.

In the case of a display panel which does not have switching elements provided for each display element, it is possible to arrange that the various electrodes are positioned upon the substrates in such a way that they are not directly opposite one another, to thereby reduce the effects of stray capacitances. However, for a display panel of the built-in switching element type, in the prior art, the row electrodes and column electrodes are formed upon the same substrate, and the reference electrode is formed over virtually the entire surface of the opposing substrate. Because of this, it is not possible to substantially reduce the values of the stray capacitances $C_{xz}$ and $C_{yz}$, with a conventional type of display panel having built-in switching elements. This is an important factor in the case of a display system for which the power consumption must be a low as possible, for example a display system of an electronic timepiece. This is particularly so because the power consumption of the switching elements, if these are of field-effect transistor type, is extremely low. If we designate the capacitance of the display elements of a display panel as $C_{lc}$, the power required to drive this capacitance $C_{lc}$ c designated as $W_{disp}$. If the switching speed of the s applied to the row and column electrodes is rela high then, with a prior art type of display panel built-in switching element type it is found tha amount of power required to drive the display pa from several tens of times to several hundreds of the value of $W_{disp}$. This increased power consump due to the necessity for driving the stray capacit $C_{xz}$ and $C_{yz}$ referred to above.

If we designate the width of each of the rov column electrodes as w, and the number of row trodes and column electrodes as each being n, the ness of the liquid crystal layer as d, the display a $W \times W$, and the dielectric constant of the liquid c as s, then the value of the capacitance $C_{lc}$ of each crystal display element is given by the equation:

$$C_{lc} = \left(\frac{W}{n} - w\right)^2 / d$$

The stray capacitance $C_{xz}$ or $C_{yz}$ of a row or cc electrode is thus approximately given as (W·w The ratio of $C_{xz}$ (or $C_{yz}$) to $C_{lc}$ is given approxin by the equation:

$$C_{xz}/C_{lc} = W \cdot w / \left(\frac{W}{n} - w\right)^2$$

If we take as an example the values $W=50$ $n=500$, $w=20$ μm, then in this case the val $C_{xz}/C_{lc}$ is approximately 156. Even if the elec width w is as small as 10 μm, the value of the $C_{xc}/C_{lc}$ is 62. From these figures, it can be under that the capacitances arising due to the positioni the row and column electrodes with respect to th erence electrode are considerably greater than tl pacitances of the display elements themselves. amount of power which is consumed in charging capacitances is approximately proportional to th ues of the capacitances, so that the power consun charging capacitance $C_{xz}$ is approximately 156 tin 62 times the power which is actually required due capacitance of the display elements, $C_{lc}$, for the ples given above. The switching frequency of the ning signal which is applied to the row electrodes comparatively low, so that the effects of the stra pacitances of the row electrodes, $C_{yz}$ are less than of the column electrode capacitances. However, switching elements consisting of CdSe or amor silicon thin-film elements are used, the amplitude scanning signal voltage applied to the gate electro the switching elements will be substantially highe: the display signal voltages applied to the column trodes. Because of this, it is not possible to igno effects of the stray capacitances of the row electi since the level of power consumption resulting charging these stray capacitances is proportional square of the amplitude of the voltage applied. thus be appreciated that the power which is dissi by the effects of the stray capacitances of the rov column electrodes will cause an overall increa display power consumption of several tens of tin several hundreds of times the consumption would be the case if such stray capacitances were absent.

Another problem which arises due to the stray capacitances of the row and column electrodes relates to the drive circuit elements which supply the scanning and display data drive signals. If we designate the total capacitance which must be driven by such a drive circuit element as Ct, and the internal resistance displayed by the drive circuit element in the ON state as Ron, then the time required to charge or discharge the capacitance Ct is inversely proportional to the product of the ON resistance and the value of the capacitance, i.e. the charge/discharge time is proportional to $(Ron.Ct)^{-1}$. Thus, in order to achieve a desired speed of switching, i.e. a desired value for the capacitance charge/discharge time, if the value of capacitance Ct is high then it is correspondingly necessary to lower the value of Ron, i.e. to lower the internal resistance of the drive circuit elements. Thus, for the example given above, in which the ratio of the column electrode capacitance to the display element capacitance is approximately 100, it would be necessary to reduce the ON resistance of the drive circuit switching elements to one hundredth of the value which would be sufficient if stray capacitance $C_{xz}$ were not present, in order to drive the display elements at a predetermined switching frequency. If the drive circuitry, i.e. the peripheral circuitry for the display panel, is composed of large-scale integrated circuit elements, then in order to reduce the ON resistance of the transistors of such circuitry it would be necessary to increase the transistor area by approximately 100 times. Such an increase will result in problems of increased power consumption and of increased area being required overall for the peripheral circuitry.

Another problem which arises in display panels of the built-up switching element type is that the number of row and column electrodes can amount to a total of several hundred or more. Thus, it becomes difficult to provide the large number of interconnecting leads required between the peripheral circuitry and the display panel. For this reason, display systems have been proposed in which at least a part of the peripheral circuitry is provided directly upon the display panel itself. If this is done, then it becomes possible to reduce the number of interconnections required. For example, the display drive signal to be supplied to a number of different column electrodes can be input over a single connecting lead, and then distributed to the various column electrodes concerned by means of a serial to parallel conversion process. However, it will be apparent that, if the number of interconnecting leads is reduced by a factor 1/a by this method, then the switching time of the display signals must be similarly reduced by the factor 1/a. If we assume the values for display element size W×W=50 mm, number of row/column electrodes n=500, liquid crystal dielectric constant $s=10.S_0$, width of row or column electrode $\omega=20$ μm, the thickness of the liquid crystal layer d=10 μm, the frame frequency=50 Hz, a=10, and capacitances $C_{lc}=0.05$ pf, $C_{xz}=C_{yz}=8$ pf, then the switching time of the display signals must be approximately 4 msec. In this case, even if $C_{xz}$ were zero, the ON resistance of the peripheral circuit switching elements must be less than $8\times10^7$ ohms. If there is a typical amount of stray capacitance associated with the row and column electrodes, then the value of the ON resistance Ron must be less than approximately $5\times10^5$ ohms. In practice, these values of Ron would have to be further reduced, in order to provide a margin of tolerance for manufacturing variations. It is very difficult to achieve such low values of ON resistance, if transistor elements formed from thin films of CdSe or amorphous Si are utilized as the peripheral circuitry switching elements, due to the fact that the carrier mobility of such transistor elements is low. Thus, while it might be barely possible to achieve a value of $10^7$ ohms for Ron, it would be almost impossible to achieve a value as low as $10^5$ ohms. From this, it can be understood that it is very difficult to provide peripheral circuitry directly upon the display panel, with conventional types of display panel, due to the stray capacitances of the row and column electrodes.

Figure 5:
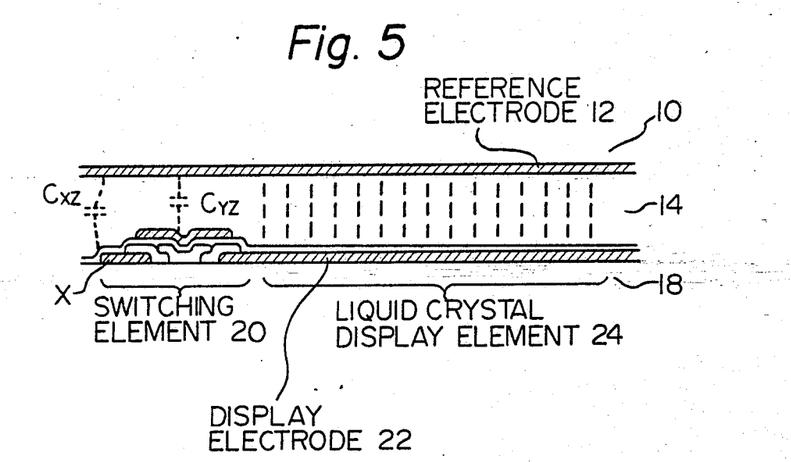
FIG. 5 is a simplified cross-sectional view of a liquid crystal display panel according to the prior art.
Figure 6:
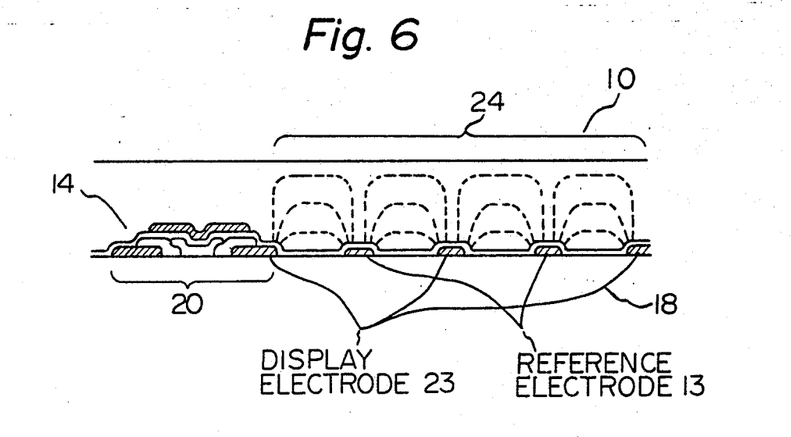
FIG. 6 is a simplified cross-sectional view of a liquid crystal display panel according to the present invention.

FIG. 6 is a simplified cross-sectional view of part of a liquid crystal display panel according to the present invention, which illustrates the differences between the present invention and the prior art. Numeral 13 designates an electrode which serves the function of reference electrode 12 in the prior art embodiments described above, while numeral 23 denotes a display electrode which, together with the reference electrode 13 serves to define a single display element in this example. Numeral 20 designates a switching element, which is coupled to the display electrode 23 in a similar way to the switching elements of the prior art examples described hereinabove. It can be seen that, with the present invention, both the reference electrode and the display electrode are formed upon the same substrate, i.e. substrate 18. As a result, the electric field which results from a display signal voltage applied to the display electrode is substantially directed in the plane of the substrates, as indicated by the broken line portions of FIG. 6. This is fundamentally different from the case of prior art liquid crystal display panels, in which the electric field is directed perpendicular to the substrate plane, as shown in FIG. 5.

Figure 7:
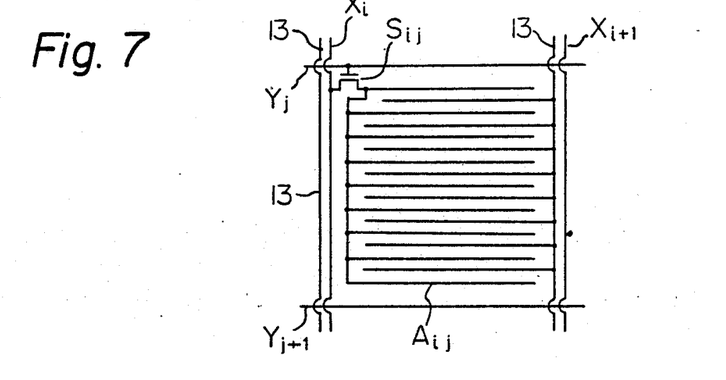
FIG. 7 is a diagram illustrating an example of electrode patterns for a display element of a liquid crystal display panel according to the present invention.

In order to define each display element by means of display electrode 23 and reference electrode 13, these electrodes are formed into comb-shaped patterns, which are arranged such as to be mutually intermeshed, but spaced slightly apart. This is illustrated in FIG. 7, which shows the configuration of a typical embodiment of the electrodes which define a single display element. This typical display element is assumed to be located within an area delimited by row conductors $Y_j$ and $Y_{j+1}$ and column conductors $X_i$ and $X_{i+1}$, and to be coupled to a display element designated as $S_{ij}$ (corresponding to switching element 20 shown in FIG. 6). The display electrode, designated as $A_{ij}$ (corresponding to display electrode 23 of FIG. 6) is arranged in a comb-shaped pattern, as shown. The reference electrode 13 is also arranged in a comb-shaped pattern, which is intermeshed with the display electrode $A_{ij}$ in the manner illustrated.

This arrangement of the electrodes in accordance with the present invention provides a number of advantages. Firstly, since the row and column electrodes are not positioned directly opposite a reference electrode provided on the opposite substrate, but are formed upon the same substrate as the reference electrode, the amount of stray capacitance associated with the row and column electrodes is significantly lower than in the case of a prior art type of liquid crystal display panel. The importance of such a reduction of stray capacitance has been explained hereinabove. Secondly, since it is not necessary to provide electrical connections between the upper and lower substrates of the display panel according to the present invention, the manufacturing of such a display panel is made considerably more simple and economical. This fact is also enhanced by the fact that it is in no way necessary to position the upper and lower substrates accurately with respect to one another, with a display panel according to the present invention.

Figure 8:
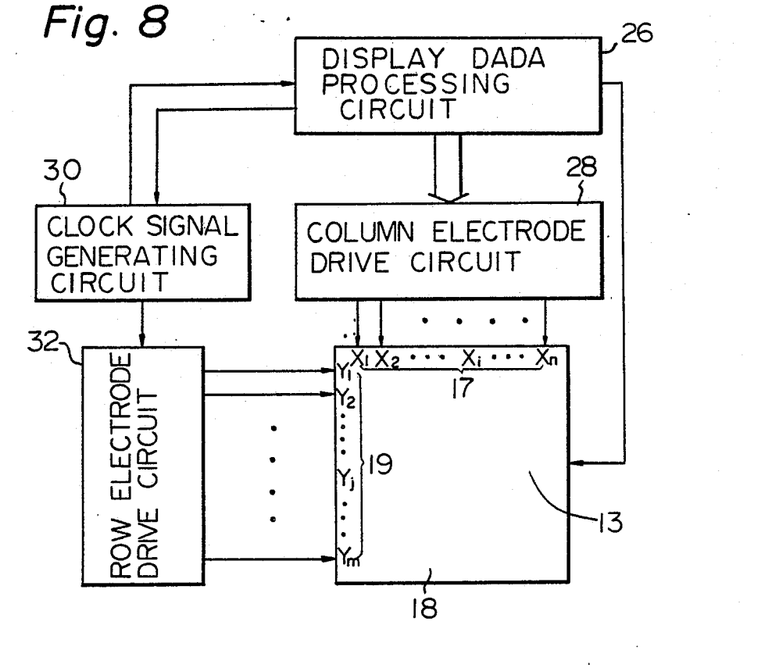
FIG. 8 is a general block diagram of a display system which includes a display panel according to the present invention.

FIG. 8 is a simplified general block diagram of a display system which includes a display panel according to the present invention. Portions of this system which correspond to the prior art display system of FIG. 4, described hereinabove, are indicated by identical reference numerals. It can be seen that the only essential difference between the display system of FIG. 8 and that of FIG. 4 is that with the system according to the present invention, the reference electrode 13 is formed upon the same substrate 18 as are the row and column electrodes 19 and 17.

Figure 9:
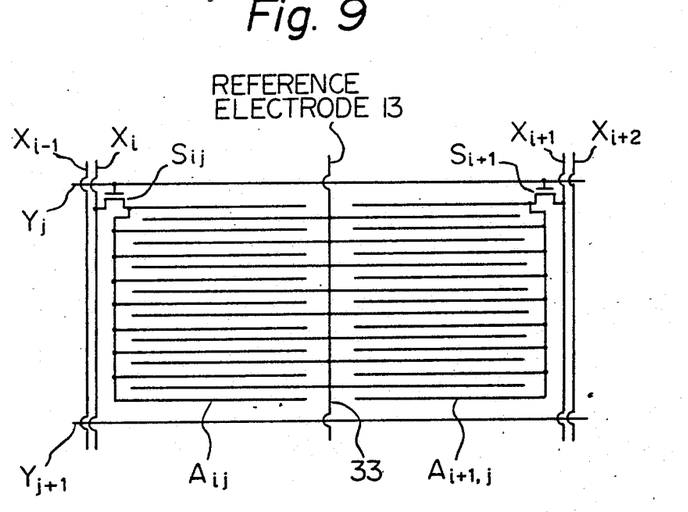
FIG. 9, FIG. 10 and FIGS. 11, 12 and 13 show other embodiments of electrode patterns of display elements for display panels according to the present invention.

FIG. 9 shows another embodiment of electrode pattern arrangements for a display panel according to the present invention. Here, pairs of display electrodes, such as $A_{ij}$ and $A_{i+l,j}$ are arranged on either side of a reference electrode conductor portion 33, with comb-shaped reference electrode patterns being arranged on either side of conductor portion 33 such as to intermesh with the display electrode patterns $A_{ij}$ and $A_{i+l,j}$.

Figure 10:
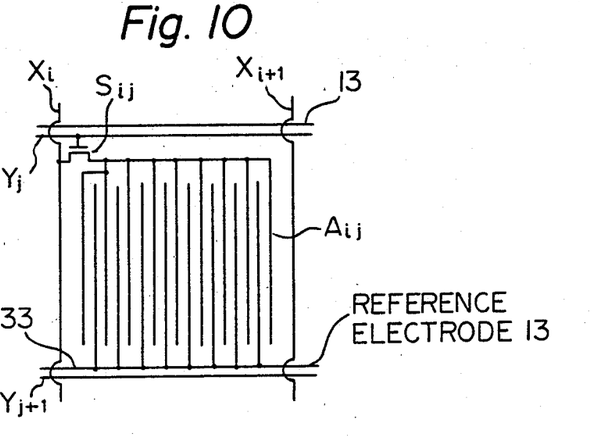
Figure 11:
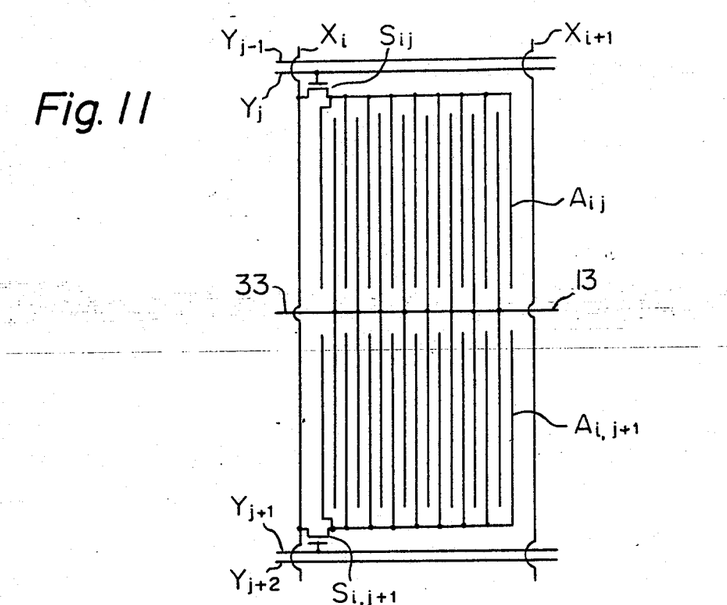

In the examples of FIG. 7 and FIG. 9, a common conductor portion of the reference electrode 13, such as is designated by 33 in FIG. 9, serving to connect various comb-shaped reference electrode portions, runs in a direction which is parallel to the column electrodes 17. However, as shown in FIG. 10 and in FIG. 11, it is equally possible to arrange that such a common conductor portion 33 of reference electrode 13 runs in a direction parallel to the row electrodes 19. In the example of FIG. 10, each comb-shaped reference electrode pattern of reference electrode 13 is formed on one side of a common conductor portion 33 of the reference electrode 13. In the example of FIG. 11, pairs of comb-shaped reference electrode patterns are formed on each side of common conductor portion 33 of reference electrode 13. It should be understood that in this specification and in the appended claims, the term "reference electrode" as used in relation to the present invention serves to designate an electrode pattern comprising a plurality of comb-shaped portions which mesh with corresponding comb-shaped display electrode patterns (such as $A_{ij}$ and $A_{i,j+l}$ in FIG. 10 and 11) to thereby define various display elements, and common conductor portions of the reference electrode pattern which serve to interconnect the various comb-shaped portions of the reference electrode pattern, whereby a fixed reference potential is applied to all of the portions of the reference electrode pattern.

In the embodiment of FIG. 7, the common conductor portions 33 of reference electrode 13 run parallel to and in close proximity with the column electrodes. Thus, there will be some stray capacitance $C_{xz}$ between the column electrodes and the reference electrode 13, but this will still be much smaller than in the case of a conventional type of display panel. Similarly, in the embodiment of FIG. 10, portion 33 of reference electrode 13 runs parallel and close to the row electrodes. Thus, some stray capacitance $C_{yz}$ will be present between the row conductors and the reference electrode, although this capacitance will be small. In the embodiment of FIG. 7, the stray capacitance $C_{yz}$ of the row conductors will be extremely small, while in the embodiment of FIG. 10, the stray capacitance $C_{xz}$ of the column conductors will be extremely small. Since the sw frequency of the scanning signal is much high that of the display signal, it is preferable to m: stray capacitance $C_{yz}$ of the column conductors a as possible. Thus, the arrangement of FIG. 7 is p ble to that of FIG. 10.

With the present invention, it is also possible to nate the reference electrode 13, and to perfor functions of a reference electrode by means of t or column electrodes. This will now be describe reference first to the embodiment of FIG. 12. I display electrode $A_{ij}$ is supplied with a display through a switching element $S_{ij}$, which is contro a row electrode $Y_j$, the display signal being su over a column electrode $X_i$. As in the previous e ments of the present invention, the display electr which defines a single display element is arrang comb-shaped pattern. However, in the embodin FIG. 12, the display electrode pattern meshes comb-shaped pattern which is coupled to the ne electrode, i.e. to electrode $Y_{j+l}$. We shall defi voltage level which causes switching element conduct, when applied over row electrode $Y_j$, a while the voltage level for which switching elen does not conduct will be designated as Voff. If sume that a potential of value (V+Voff) is app the column electrode $X_i$ while switching element the conducting condition, then since at this tin electrode $Y_{j+l}$ is in the non-selected condition, i a potential Voff, a potential difference (Vo$-$Voff=V will appear between display electrc and the row electrode $Y_{j+l}$. If we assume that pacitance of the corresponding display element then a charge $C_{lc}.V$ will become stored in this element. When now the row electrode $Y_{j+l}$ is s by applying a potential Von to that electrode, sw element $S_{ij}$ will enter the non-conducting state, the charge $Q_{lc}$ will be held unchanged. This is t the potential of display electrode $A_{ij}$ becomes V so that the potential difference between the ro trodes $A_{ij}$ and $A_{ij+l}$ is held constant. Subseq while both row electrodes $Y_j$ and $Y_{j+l}$ are in tł selected state, i.e. while a potential Voff is app these electrodes, the potential difference betwe play electrode $A_{ij}$ and row electrode $A_{j+l}$ is still V, since then the display electrode takes the pc (Voff+V).

From the above it can be seen that, if the char: tics of the switching elements are suitably matc the electrode voltages applied, it is possible to uti row electrodes to perform the functions of a re electrode, which has been required in prior art t liquid crystal display panels. This embodiment various advantages, which include easier layou! electrodes, improved efficiency of utilization display area, greater ease of manufacture, etc. I tion, the embodiment of FIG. 12 can also prov vantages in terms of the drive power requireme easier provision of drive circuitry.

Figure 12:
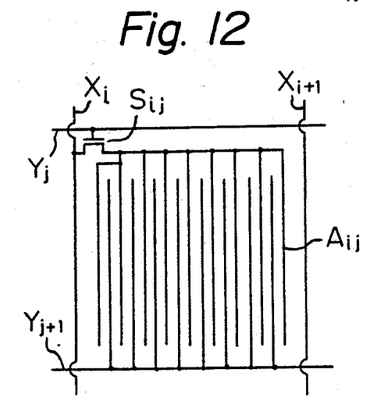

It should be noted that, although not shown i 12, it is also possible for row electrode $Y_j$ to perfc functions of a reference electrode.

Figure 13:
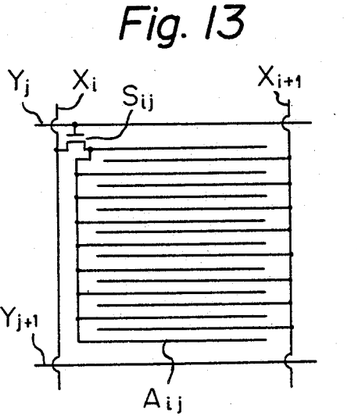

FIG. 13 shows another embodiment, in whicl umn electrode $X_{i+l}$ also serves as a reference ele In this case, the display signal is applied as a difference between the column electrodes $X_i$ an and is thereafter held constant in a similar ma that which has been described for the embodir FIG. 12. The embodiment of FIG. 13 will require more complex processing of the display signal data, however it can result in simplification of the construction of the display panel itself.

In the embodiments of the present invention shown in FIGS. 7 to 13, the display electrodes (e.g. $A_{ij}$) and the reference electrode 13, as well as the row and column electrodes can be formed of a nontransparent material, such as a metallic film, or can be transparent, i.e. formed of some material such as $In_2O_3$, Sn, $SnO_2$, or other suitable conductive material. The reason why it is possible to use non transparent electrodes, even in the case of a display panel in which light is transmitted through the panel, is that the comb-shaped electrode patterns which define each display elementt can be formed of lines having an extremely narrow width. If this is done, at least in those parts of the electrode patterns which define a display element, then it is not necessary to use transparent conductive films to form the display and other electrodes. If the electrodes are formed from a metallic material, then the comb-shaped patterns can be formed of very narrow width lines, by etching a metallic film. In this way, it is practicable to make the line width of the electrodes very narrow, e.g. of the order of 1 $\mu$m.

The comb-shaped portions of the electrode pattern can be formed in the same process in which the other portions of the electrodes are formed (i.e. the interconnecting leads for the row and column electrodes, reference electrodes and display electrodes). However, it is equally possible to form the comb-shaped portions of the electrode patterns by a separate process. Throughhole connections or other methods may be used to perform connections to the electrodes.

The present invention is applicable to display panels which utilize liquid crystal display modes of various types, e.g. the twisted nematic (TN) mode, the guest-host (GH) mode, the electrically controlled birefringence (ECB) mode, the phase transition (PT) mode, as well as current-effect modes such as the dynamic-scattering (DS) mode. For all of these modes, it is possible to achieve a display effect by applying an electric field directed substantially in the plane of the display panel substrates, by means of comb-shaped intermeshed electrodes in accordance with the present invention.

In the case of liquid crystal display modes in which polarizing elements are used (e.g. the TN mode, the GH mode, the ECB mode, etc), the actual display effect will vary depending upon the relationship between the direction of alignment of the lines in the comb-shaped portions of the electrode pattern and the direction of the plane of polarization. Special display effects can thereby be obtained by aligning the lines of the comb-shaped patterns either parallel to or perpendicular to the plane of polarization.

In the descriptions of the preferred embodiments, it has been assumed that thin-film transistors are used as switching elements on the display panel. However, it is equally possible to use various other types of switching elements, including diodes, varistors, etc. In addition, it is possible to utilize bulk-formed devices as switching elements, instead of thin-film devices.

From the above descriptions of the preferred embodiments, it can be understood that the present invention enables a liquid crystal display panel to be produced having built-in switching elements provided individually for the display elements, whereby the stray capacitances associated with the row and column electrodes of the display panel are substantially reduced by comparison with prior art types of liquid crystal display panel. As a result, a liquid crystal display panel according to the present invention enables a substantial reduction in the power consumption to be achieved, together with an increase in the maximum practicable speed of switching of signals applied to the electrodes of the display panel. In addition, the mode of construction of a liquid crystal display panel according to the present invention serves to facilitate the manufacture of the panel, whereby manufacturing costs can be substantially reduced. A liquid crystal display panel according to the present invention is particularly suited to portable electronic devices such as electronic timepieces, in which the level of power consumption must be as low as possible.

From the preceding description, it will be apparent that the objectives set forth for the present invention are effectively attained. Since various changes and modification to the above construction may be made, without departing from the spirit and scope of the present invention, it is intended that all matter contained in the above description or shown in the accompanying drawings shall be interpreted as illustrative, and not in a limiting sense. The appended claims are intended to cover all of the generic and specific features of the invention described herein.

What is claimed is:

1. In a liquid crystal display panel having a layer of liquid crystal material enclosed between a pair of substrates, a set of row electrodes and a set of column electrodes formed on said substrates to mutually intersect, a plurality of display electrodes arranged in positions corresponding to intersections of said row and column electrodes, a plurality of switching elements each coupled between an intersection of said row and column electrodes and a corresponding one of said display electrodes, a source of scanning signals for selectively rendering said switching elements conductive and a source of display signal voltages, said display signal voltages being selectively applied to said display electrodes through said switching elements in response to said scanning signals, and a reference electrode which is held at a predetermined potential, the improvement whereby said display electrodes are arranged in relationship to said reference electrode such that an electric field is applied to said liquid crystal material in a direction having at least a component directed parallel to the plane of said substrates in response to a potential difference between said display signal voltage applied to one of said display electrodes and the potential of said reference electrode.

2. The improvement according to claim 1, wherein both said display electrodes and said reference electrode are formed upon a single one of said substrates.

3. The improvement according to claim 2, wherein each of said display electrodes is formed in a comb-shaped pattern, and wherein a comb-shaped pattern forming a portion of said reference electrode is arranged to intermesh in close proximity with each of said comb-shaped display electrodes.

4. The improvement according to claim 3, wherein said display electrodes and said reference electrode are formed from transparent films of conductive material.

5. The improvement according to claim 3, wherein said display electrodes and said reference electrodes are formed from a non-transparent material and wherein the widths of line portions of said comb-shaped patterns are formed to a thickness of less than 10 microns.

6. The improvement according to claim 1, wherein each of said row electrodes further functions as a reference electrode during times when switching elements controlled by said each row electrode are in a non-selected status, by appropriate choice of the potentials of said scanning signals and said display signals.

7. The improvement according to claim 1, w[herein] each of said column electrodes also functions as a [refer]ence electrode, by appropriate choice of the pot[entials] and switching timings of said scanning signals an[d said] display signals.

8. The improvement according to claim 1, w[herein] said switching elements comprise thin-film field[-effect] transistors, having gate electrodes coupled to sai[d row] electrodes.

* * * * *